(12) United States Patent
Jing et al.

(10) Patent No.: US 9,679,134 B1
(45) Date of Patent: Jun. 13, 2017

(54) SYSTEMS AND METHODS FOR DETECTING DISPLAY-CONTROLLING MALWARE

(71) Applicant: Symantec Corporation, Mountain View, CA (US)

(72) Inventors: Rui Jing, Los Angeles, CA (US);
James Hung, Alhambra, CA (US);
Rong Zhou, Sichuan (CN)

(73) Assignee: Symantec Corporation, Mountain View, CA (US)

( * ) Notice: Subject to any disclaimer, the term of this patent is extended or adjusted under 35 U.S.C. 154(b) by 323 days.

(21) Appl. No.: 14/221,259

(22) Filed: Mar. 20, 2014

(51) Int. Cl.
*G06F 21/56* (2013.01)
*H04L 29/06* (2006.01)

(52) U.S. Cl.
CPC ............ *G06F 21/56* (2013.01); *G06F 21/566* (2013.01); *H04L 63/145* (2013.01)

(58) Field of Classification Search
None
See application file for complete search history.

(56) References Cited

U.S. PATENT DOCUMENTS

| | | | | |
|---|---|---|---|---|
| 8,776,227 B1 * | 7/2014 | Glick | .................... | G06F 21/566 726/23 |
| 8,856,542 B2 * | 10/2014 | Tatarinov | .............. | G06F 21/316 709/224 |
| 8,904,538 B1 * | 12/2014 | Glick | ..................... | G06F 21/56 726/24 |
| 2014/0053262 A1 * | 2/2014 | Sarangdhar | ............... | G06F 3/14 726/22 |
| 2014/0281919 A1 * | 9/2014 | Giuliani | ............ | G06F 17/30899 715/234 |

* cited by examiner

*Primary Examiner* — Azizul Choudhury
(74) *Attorney, Agent, or Firm* — FisherBroyles LLP (57) ABSTRACT

A computer-implemented method for detecting display-controlling malware may include (1) identifying a software program that is controlling a display of the computing device, (2) detecting one or more measures taken by the software program to prevent loss of control of the computing device display, (3) performing an analysis of the software program that may include determining, based on the measure taken by the software program to prevent loss of control of the computing device display, that the software program is suspicious and possibly includes display-controlling malware, and (4) performing a security action in response to determining that the software program is suspicious and possibly includes display-controlling malware. Various other methods, systems, and computer-readable media are also disclosed.

17 Claims, 5 Drawing Sheets

SYSTEMS AND METHODS FOR DETECTING DISPLAY-CONTROLLING MALWARE

BACKGROUND

As increasingly seen in recent years, display-controlling malware may take control of the display of a computing device and may prevent a user from regaining control of the device. Display-controlling malware commonly takes the form of ransomware, which may attempt to restrict access to the computing device until the user makes a payment to the malware's creator. Ransomware typically claims that the user has accessed illegal content or is running pirated software and that the user must pay a fine to regain access to the device.

Detecting display-controlling malware may pose particular challenges to developers of anti-malware systems, as compared to other forms of malware. Display-controlling malware may be implemented as a standalone program, or may infect another program, as with a computer virus. Propagation may occur via many of the same mechanisms as other forms of malware. Code analysis or behavioral analysis detection methods may prove ineffective, since display-controlling malware may use many of the same operating system interfaces as harmless programs while avoiding many of the malicious behaviors that characterize other forms of malware.

Accordingly, the instant disclosure identifies and addresses a need for additional and improved systems and methods for detecting display-controlling malware.

SUMMARY

As will be described in greater detail below, the instant disclosure describes various systems and methods for detecting display-controlling malware by identifying a software program that is in control of a computer system display and detecting whether the software program has taken measures to prevent loss of control of the display. Upon identifying a suspicious software program, systems and methods described herein may further analyze the suspicious software program by querying a reputation database and/or by making behavioral observations. If it is determined that the software program includes display-controlling malware, various security actions may be initiated.

In one example, a computer-implemented method for detecting display-controlling malware may include (1) identifying a software program that is controlling a display of a computing device, (2) detecting one or more measures taken by the software program to prevent loss of control of the computing device display, (3) performing an analysis of the software program that may include determining, based on the measure taken by the software program to prevent loss of control of the computing device display, that the software program is suspicious and possibly includes display-controlling malware, and (4) performing a security action in response to determining that the software program is suspicious and possibly includes display-controlling malware.

In some examples, identifying the software program that is controlling the display of the computing device may include (1) determining that the software program is displaying an application view in a full-display foreground view and/or (2) determining that the software program is displaying an application view in an active display that is not a default display for the computing device.

In one embodiment, the measure taken by the software program to prevent loss of control of the computing device display may include (1) displaying a full-display application view, (2) displaying the application view in an active display that is not the default display for the computing device, (3) configuring the software program to launch during an operating system start-up procedure, (4) blocking one or more actions of a user of the computing device to take control of the computing device display away from the software program, (5) blocking one or more actions of a second software program to take control of the computing device display away from the software program, (6) disabling the second software program, (7) blocking display of an application view of the second software program, (8) displaying the application view without identification of the software program, and/or (9) displaying the application view while omitting a control for modifying the application view. Controls for modifying the application view that the software program may omit include (a) a control for resizing the application view, (b) a control for closing the application view, (c) a control for moving the application view, and/or (d) a control for minimizing the application view.

In some examples, configuring the software program to launch during an operating start-up procedure may include (1) installing the software program in a storage location used by the operating system to contain software programs to be executed during the operating system start-up procedure and/or (2) configuring the software program in a configuration data store of the operating system to be executed during the operating system start-up procedure.

In one embodiment, the analysis of the software program may include (1) obtaining information that identifies the software program, (2) querying, using the information that identifies the software program, a program reputation database that associates software program information with software program reputation scores, (3) receiving, in response to querying the program reputation database, a reputation score for the software program, (4) determining, based on the reputation score for the software program, that the software program is not safe, and (5) determining, based on the measure taken by the software program to prevent loss of control of the computing device display and the reputation for the software program being not safe, that the software program is suspicious and possibly includes display-controlling malware.

In some examples, obtaining information that identifies the software program may include (1) calculating a signature hash for the software program, (2) identifying a behavioral property of the software program, (3) identifying a storage location for an executable file of the software program, (4) identifying a process of the software program, and/or (5) identifying at least one attribute of the application view of the software program. In some examples, determining that the software program is not safe may include (1) identifying a reputation threshold that is indicative of the software program being unsafe and (2) determining, based on the reputation score being below the reputation threshold, that the software program is not safe.

In one embodiment, the analysis of the software program may further include (1) performing a behavioral observation of the software program including at least one of (a) determining that the software program is not playing audio data, (b) determining that a camera attached to the computing device is not active, (c) determining that the software program does not use a motion-video display interface, (d) determining that the software program application view does not continuously change, and (2) determining, based on the measure taken by the software program to prevent loss of control of the computing device display and the behavioral observation, that the software program is suspicious and possibly includes display-controlling malware.

In one embodiment, the security action may include (1) disabling the software program, (2) providing a user interface element that enables a user of the computing device to activate a second display for the computing device, where the second display is not controlled by the software program, and/or (3) notifying an administrator that the software program is suspicious and possibly includes display-controlling malware.

In one embodiment, a system for implementing the above-described method may include several modules stored in memory, such as (1) an identification module that identifies a software program that is controlling a display of the computing device, (2) a detection module that detects at least one measure taken by the software program to prevent loss of control of the computing device display, (3) an analysis module that performs an analysis of the software program that determines, based on the measure taken by the software program to prevent loss of control, that the software program is suspicious and possibly includes display-controlling malware, and (4) a security module that performs a security action in response to determining that the software program is suspicious and possibly includes display-controlling malware. The system may also include one or more physical processors configured to execute the identification module, the detection module, the analysis module, and the security module.

In some examples, the above-described method may be encoded as computer-readable instructions on a non-transitory computer-readable-storage medium. For example, a computer-readable-storage medium may include one or more computer-executable instructions that, when executed by at least one processor of a computing device, may cause the computing device to (1) identify a software program that is controlling a display of the computing device, (2) detect at least one measure taken by the software program to prevent loss of control of the computing device display, (3) perform an analysis of the software program that determines, based on the measure taken by the software program to prevent loss of control, that the software program is suspicious an possibly includes display-controlling malware, and (4) perform a security action in response to determining that the software program includes display-controlling malware.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for detecting display-controlling malware. As will be explained in greater detail below, the systems and methods described herein may detect display-controlling malware by detecting measures taken by a software program to obtain and retain control of a computing device display. Tentative identification of a suspicious software program may then result in in-depth analysis, possibly including obtaining a reputation for the software program. Using these systems and methods may yield several advantages. New or previously-unidentified display-controlling malware programs may be identified, based on their behavior. Display-controlling malware may be identified with greater accuracy versus code analysis methods or methods relying solely behavioral analysis. False positive identifications may be averted by comparing observed behavior of the software program with the behavior of various categories of harmless software programs.

Figure 1:
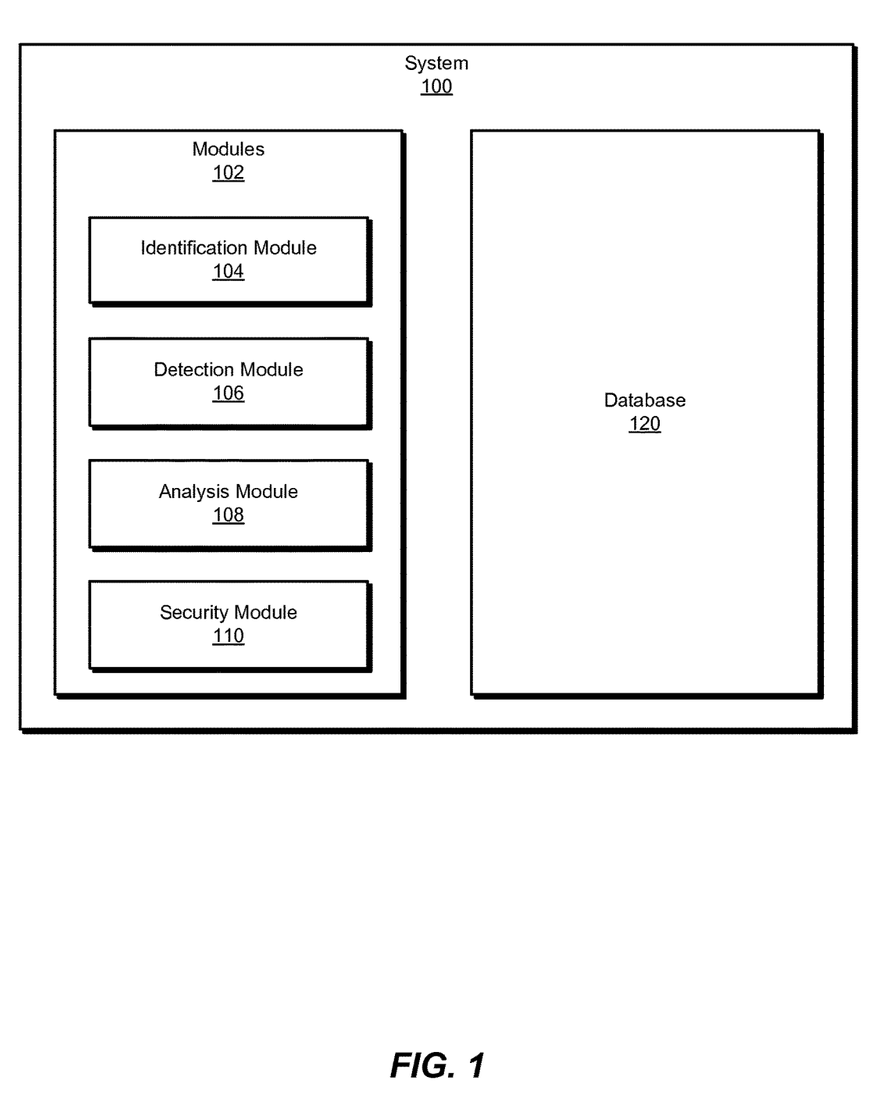
FIG. 1 is a block diagram of an exemplary system for detecting display-controlling malware.
Figure 2:
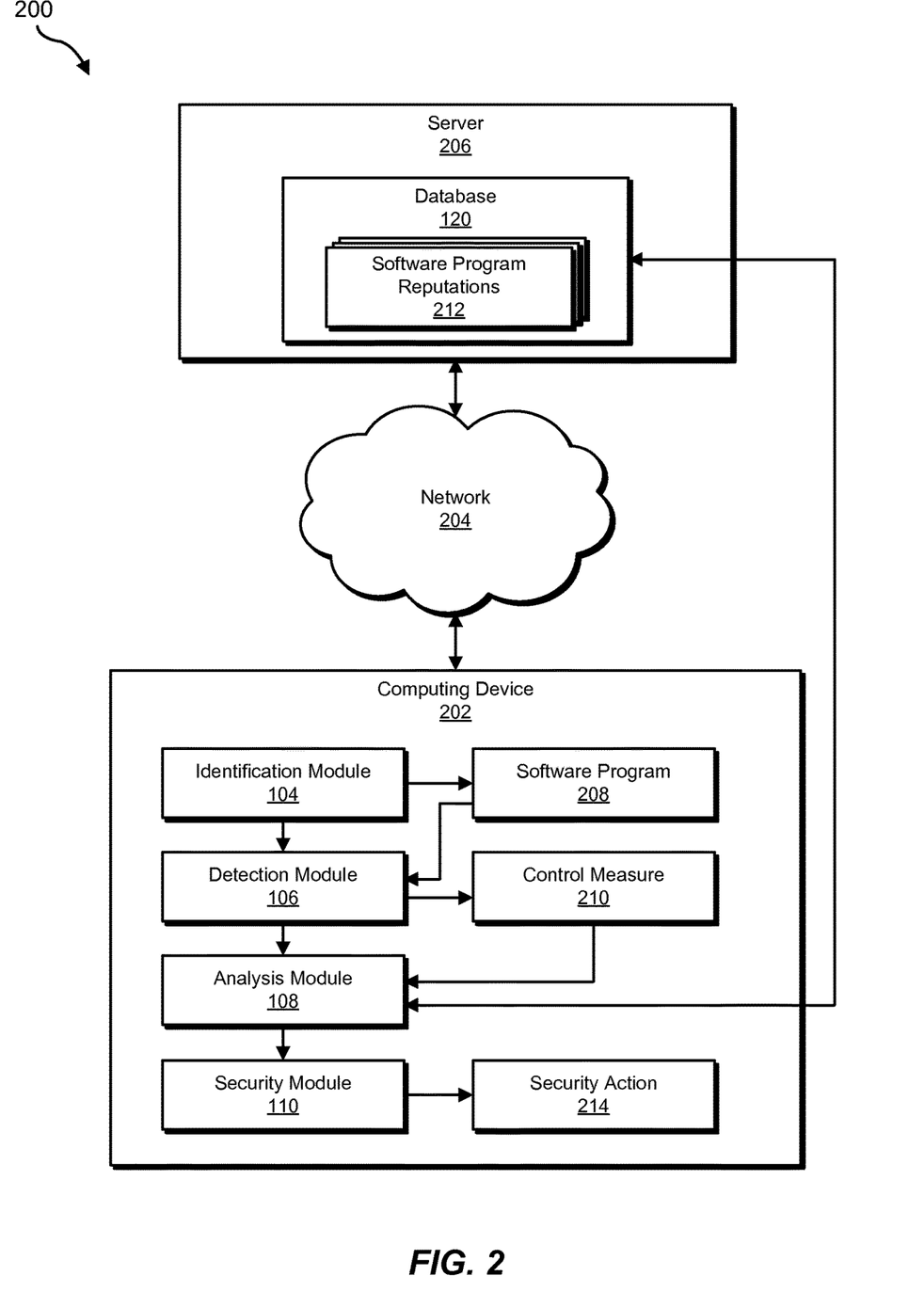
FIG. 2 is a block diagram of an additional exemplary system for detecting display-controlling malware.

The following will provide, with reference to FIGS. 1-2, detailed descriptions of exemplary systems for detecting display-controlling malware. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 4 and 5, respectively.

FIG. 1 is a block diagram of an exemplary system 100 for detecting display-controlling malware. As illustrated in this figure, exemplary system 100 may include one or more modules 102 for performing one or more tasks. For example, and as will be explained in greater detail below, exemplary system 100 may include several modules stored in memory, such as an identification module 104 that identifies a software program that is controlling a display of the computing device. Exemplary system 100 may also include a detection module 106 that detects one or more measures taken by the software program to prevent loss of control of the computing device display.

In addition, and as will be described in greater detail below, exemplary system 100 may include an analysis module 108 that determines, based on the measure taken by the software program to prevent loss of control, that the software program is suspicious and may include display-controlling malware. Exemplary system 100 may also include a security module 110 that performs a security action in response to determining that the software program includes display-controlling malware. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 410 in FIG. 4, and/or portions of exemplary network architecture 500 in FIG. 5. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store software program reputation data that associates software program identifications with assessments of software program reputations, such as reputation scores.

Database 120 may represent portions of a single database or computing device or a plurality of databases or computing devices. For example, database 120 may represent a portion of server 206 in FIG. 2, computing system 410 in FIG. 4, and/or portions of exemplary network architecture 500 in FIG. 5. Alternatively, database 120 in FIG. 1 may represent one or more physically separate devices capable of being accessed by a computing device, such as server 206 in FIG. 2, computing system 410 in FIG. 4, and/or portions of exemplary network architecture 500 in FIG. 5.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102 and/or may store all or a portion of the data in database 120. Additionally or alternatively, server 206 may be programmed with one or more of modules 102 and/or may store all or a portion of the data in database 120.

In one embodiment, one or more of modules 102 from FIG. 1 may, when executed by at least one processor of computing device 202 and/or server 206, enable computing device 202 and/or server 206 to detect display-controlling malware. For example, and as will be described in greater detail below, one or more of modules 102, such as identification module 104 may cause computing device 202 and/or server 206 to identify a software program 208 that is controlling a display of computing device 202. Detection module 106 may detect one or more control measures 210 used by software program 208 to prevent loss of control of the display of computing device 202. Analysis module 108 may, based on control measure 210, determine that software program 208 is suspicious and may include display-controlling malware. In response to determining that software program 208 includes display-controlling malware, security module 110 may perform one or more security actions 214.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 410 in FIG. 4, or any other suitable computing device.

Server 206 generally represents any type or form of computing device that is capable of storing, comparing, and/or providing data. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 500 in FIG. 5, or the like. Network 204 may facilitate communication or data transfer using wireless or wired connections. In one embodiment, network 204 may facilitate communication between computing device 202 and server 206.

Figure 3:
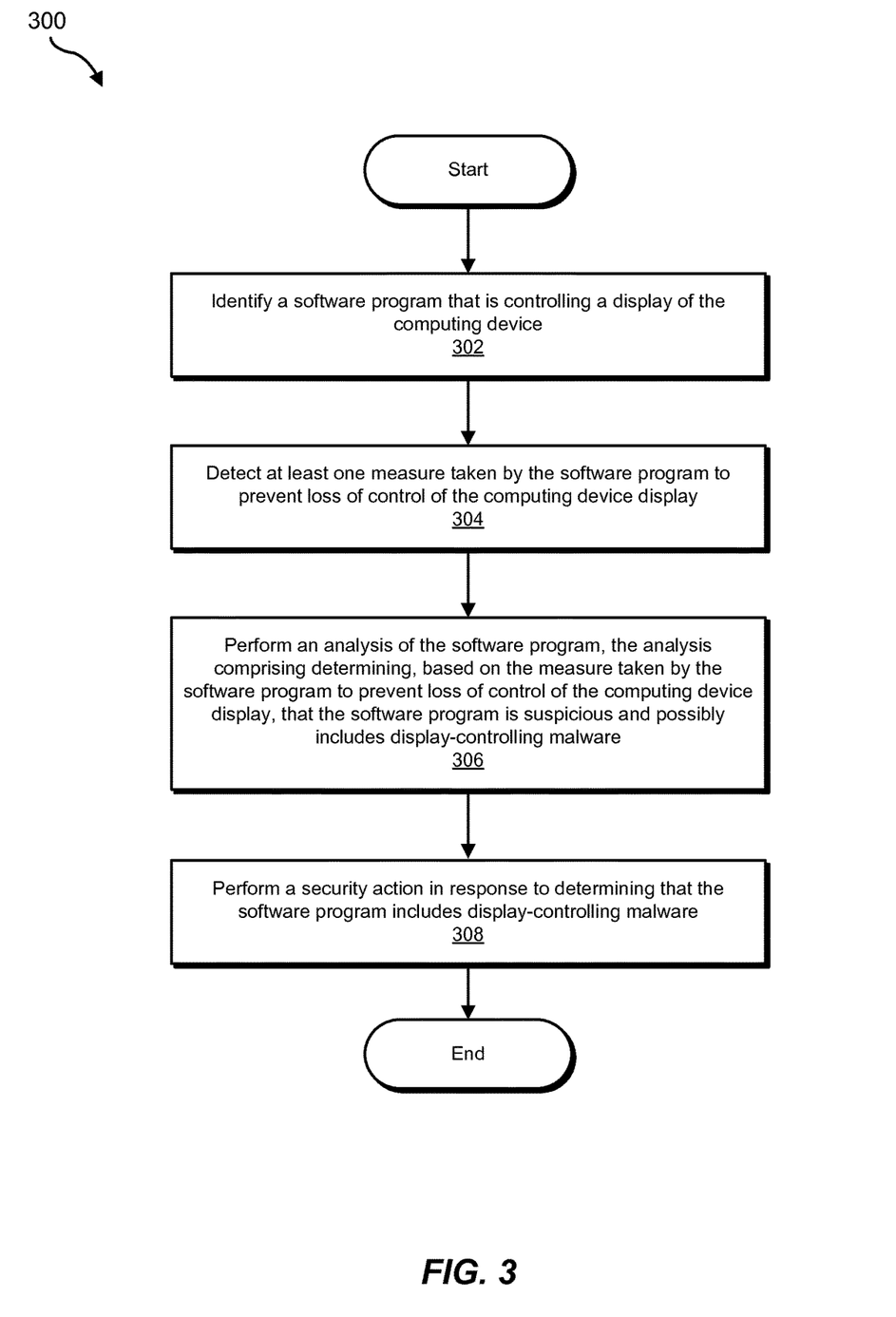
FIG. 3 is a flow diagram of an exemplary method for detecting display-controlling malware.

FIG. 3 is a flow diagram of an exemplary computer-implemented method 300 for detecting display-controlling malware. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 410 in FIG. 4, and/or portions of exemplary network architecture 500 in FIG. 5.

As illustrated in FIG. 3, at step 302 one or more of the systems described herein may identify a software program that is controlling a display of the computing device. For example, at step 302 identification module 104 may, as part of computing device 202 in FIG. 2, identify a software program 208 that is controlling a display of computing device 202. As used herein, the phrase "software program" generally refers to any type or form of executable code (i.e., sequence of computer-readable instructions). Software programs may include, without limitation, system software, application software, utility programs, productivity programs, entertainment programs, and/or any other types of computer applications.

The term "display," as used herein, generally refers to an electronic device used for visual display of computing device output. Computing device operating systems typically provide programming interfaces that enable software programs to display an application view containing textual or graphical output from the software program. Application views may be displayed in overlapping windows, with one or more application views in the foreground and one or more others in the background, partially or completely obscured by the foreground application view. A software program may create an application view that fills the entire display. The computing device operating system may then enable a user to switch between application views by use of input devices such as a keyboard, mouse, or touchscreen.

Some computing device operating systems may enable a user to create a virtual display that may not match the dimensions of the physical display. For example, a virtual display (sometimes referred to as a "virtual desktop") may be larger than can be displayed on the computing device's physical display. The user may be permitted to reposition the virtual display using devices such as a keyboard, mouse, or touchscreen to bring undisplayed portions of the virtual display into view. Some operating systems may allow multiple virtual displays, each displaying a different set of application views, with a provision for the user to switch between views of virtual displays. In such instances, one of the virtual displays may be designated the "default display," where software program application views are created unless the user or the software program itself specify otherwise.

Identification module 104 may identify a software program that is controlling a display of the computing device in a variety of ways. In some examples, identifying the software program that is controlling the display of the computing device may include determining that the software program is displaying an application window in a full-display foreground view. Display-controlling malware may prevent the user from switching control of a computing device display in part by preventing the user from viewing other application views. The user may then be unable to use a mouse or touchscreen to switch control of the display to another application. Identification module 104 may use operating system application programming interfaces (APIs) to determine the display mode in use by the software program. As will be discussed in greater detail below, some harmless software programs, such as some games, also operate in full-display foreground mode. Systems and methods described herein may prevent false positive identification of such programs as display-controlling malware.

In other examples, identification module 104 may identify a software program that is controlling a display of the computing device by determining that the software program is displaying an application window in an active display that is not a default display for the computing device. A software program that includes display-controlling malware may maintain control of a computing device display in part by creating a virtual display, making the new virtual display the active display on the physical display device, and displaying the output of the software program on the new virtual display. Software program application views on another virtual display may consequently not be visible to the user.

Returning to FIG. 3, at step 304 one or more of the systems described herein may detect measures taken by the software program to prevent loss of control of the computing device display. For example, at step 304 detection module 106 may, as part of computing device 202 in FIG. 2, detect at least one control measure 210 taken by software program 208 to prevent loss of control of a display of computing device 202.

Detection module 106 may detect measures taken by a software program to prevent loss of control of a computing device display in a variety of ways. For example, and as previously discussed in greater detail, detection module 106 may use operating system APIs to detect that the software program is using a full-display foreground application view or displaying the application view in an active display that is not the default display for the computing device.

In another example, detection module 106 may detect that the software program has configured itself to launch during an operating system start-up procedure. The phrase "start-up procedure," as used herein, generally refers to the set of operations a computing system performs when initializing an operating environment. Start-up procedures may be performed upon turning on a computing device or loading a virtual machine and may include loading device drivers that interface with peripheral devices, initializing an operating system and virtual display environment, and/or starting one or more software programs.

In some examples, configuring the software program to launch during an operating start-up procedure may include installing the software program in a storage location used by the operating system to contain software programs to be executed during the operating system start-up procedure. Some operating systems provide a storage location, such as a folder or file system directory, where software program executable files may be placed for execution at the end of the operating system startup procedure. A user may place a frequently-used software program executable file in this startup directory so that the software program is available whenever the computing device is restarted. Display-controlling malware may take advantage of this operating system feature to assure that the malware software program gains control of the computing device display at system startup.

In other examples, configuring the software program to launch during an operating start-up procedure may include configuring the software program in a configuration data store of the operating system to be executed during the operating system start-up procedure. Most operating systems include a mechanism for indicating software programs to be executed at system startup, in addition to the startup directory discussed above. For example, an operating system may provide a configuration file or database where an entry may be made, indicating that a software program is to be executed at system startup. This operating system feature is provided, in part, to start software programs that provide services such as communication or display services to other software programs. Display-controlling malware may use this operating system feature to take control of the computing device display at system startup.

In another example, detection module 106 may detect that the software program is attempting to prevent loss of control of the computing device display by blocking user actions. For example, a user may normally switch between application views using a combination of keystrokes. Another keystroke combination may interrupt running software programs and return control of the display device to the operating system or an operating system utility program (such as a process manager). Display-controlling malware may block or intercept these keystroke combinations. A software program may be determined to be particularly suspicious if detection module 106 detects that keystroke combinations or other user actions have been repeated multiple times in a row and/or blocked.

In another example, detection module 106 may detect that a software program is attempting to prevent loss of control of a computing device display by blocking actions of a second software program that may take control of the computing device display away from the software program. Display-controlling malware may do this by blocking attempts by other software programs to switch to full-screen display mode, by disabling other software programs or by blocking the display of application views other software programs. Detection module 106 may detect that a software program has been disabled or terminated or that an attempt by another software program to change application display mode has failed.

In another example, detection module 106 may detect that the software program is attempting to prevent loss of control of the computing device display by using a non-standard application view. For example, the software program may display an application view without identification of the software program. The software program may also omit controls for modifying the application view. The term "control," as used herein, generally refers to a graphical device included in an application display for modifying the application display. For example, controls may include a button or icon that a user may click with a mouse to close, resize, or move an application display. Controls may also bring a background application view to the foreground or temporarily hide (sometimes referred to as "minimizing") an application view. By omitting controls for resizing, closing, moving or minimizing the application view, the software program may prevent the user from taking control of the display device away from the software program.

Returning to FIG. 3, at step 306 one or more of the systems described herein may perform an analysis of the software program that determines, based on the measure taken by the software program to prevent loss of control, that the software program is suspicious and possibly includes display-controlling malware. For example, at step 306 analysis module 108 may, as part of computing device 202 in FIG. 2, determine, based on control measure 210 taken by software program 208 to prevent loss of control, that software program 208 is suspicious and may include display-controlling malware.

In some examples, depending upon the nature of control measures taken by the software program, analysis module 108 may determine that the suspicious software program merits additional in-depth analysis, such as to assess the reputation of the software program. In some examples, the nature of the control measures taken by the software program may alone be sufficient to determine that the software program includes display-controlling malware. For example, analysis module 108 may determine that a software program that operates in full-display application view mode and terminates other software programs running on the computing device includes display-controlling malware, while a software program that takes less onerous measures to maintain control of the display device may be merely suspicious and merit further analysis.

In some examples, analysis module 108 may, in response to determining that the software program is suspicious and may include display-controlling malware, obtain a reputation score for the software program. The term "reputation," as used herein, generally refers to an indication of the trustworthiness, prevalence, prominence, community opinion, and/or reputation of a software application. A reputation may be based on a variety of factors, such as the percentage of devices or number of devices on which the software program is installed (e.g., prevalence of the software program in a wide area network, prevalence of the software program on the Internet, prevalence of the software program on devices and networks outside a local network, etc.), the length of time the software program has been in use on one or more devices, an indication of the reliability of the publisher or developer of the software program, an indication of the likelihood that the software program may contain malware, a community rating of the software program, an evaluation of the software program by a trusted entity, and/or any other suitable factor. Factors of a software program's reputation may be quantified, and two or more factors of a reputation score may be weighted and combined to yield a single numerical value or reputation score.

Analysis module 108 may obtain a reputation score for the software program in a variety of ways. In some examples, obtaining a reputation for the software program may include (1) obtaining information that identifies the software program, (2) querying, using the information that identifies the software program, a program reputation database that associates software program information with software program reputation scores, (3) receiving, in response to querying the program reputation database, a reputation score for the software program (4) determining, based on the reputation for the software program, that the software program is not safe, and (5) determining, based on the measure taken by the software program to prevent loss of control of the computing device display and the reputation for the software program being not safe, that the software program is suspicious and possibly includes display-controlling malware.

In some examples, obtaining information that identifies the software program may include calculating a signature hash for the software program. The phrase "signature hash," as used herein, generally refers to a numeric or alphanumeric string calculated by applying a hash function to all or part of a software program. A signature hash may be used to identify a software program. In some examples, obtaining information that identifies the software program may include identifying a behavioral property of the software program, such as calling a specific operating system routine at identified points in the software program's operation or accessing a specific network location.

In some examples, obtaining information that identifies the software program may include identifying a storage location for an executable file of the software program. The storage location may include both the name of the executable file and the file's location in the file system directory structure. In some examples, obtaining information that identifies the software program may include identifying a process of the software program. Identifying a process of the software program may include obtaining the process name, size, or a signature hash of the process in memory. In some examples, obtaining information that identifies the software program may include identifying one or more attributes of the software program application view. For example, analysis module 108 may identify a software program by a label, size, and/or position of the application view, or by a graphical element displayed in the application view.

Analysis module 108 may determine, based on the reputation for the software program, that the software program is not safe in a variety of ways. In some examples, analysis module 108 may determine that the software program is not safe by (1) identifying a reputation threshold indicating that the software program is safe, and (2) determining, based on the reputation score being below the reputation threshold, that the software program is not safe.

In one embodiment, analysis module 108 may perform a behavioral observation of the software program. A behavioral observation of the software program may include determining (a) whether the software program is playing audio data, (b) whether the software program has activated a camera attached to the computing device, (c) whether the software program is using a motion-video display interface, or (d) whether the software program application view is continuously changing. Determining whether the software program application view is continuously changing may include selecting specific areas of the application view (such as the corners and/or center) and monitoring the selected areas to determine if the data displayed in the areas changes.

Behavioral observations may prevent false positive malware identifications by comparing the behavior of a suspicious software program with the behavior of harmless software programs. For example, many games use a full-screen application display mode, as do software programs that display video from a DVD or streamed from the internet. Media players typically use motion-video display interfaces, such as DIRECTX or OPENGL. Video conferencing applications may use a full-screen display while a camera attached to the computing device is active. By distinguishing behavior of such legitimate uses of a display from malicious use of a display, the systems described herein may avoid false-positive detection of malware.

At step 308 one or more of the systems described herein may perform a security action in response to determining that the software program includes display-controlling malware. For example, at step 308 security module 110 may, as part of computing device 202 in FIG. 2, perform security action 214 in response to determining that software program 208 includes display-controlling malware.

Security module 110 may perform a security action in any suitable manner. For example, security module 110 may disable the software program. In another example, security module 110 may provide a user interface element or set of hot keys that enable a user of the computing device to activate an additional virtual display for the computing device. The user may use the additional virtual display to identify and remove the display-controlling malware software program. Security module 110 may, in another example, notify an administrator that the software program includes display-controlling malware.

As explained above, the systems and methods described herein may detect display-controlling malware by detecting measures taken by a software program to obtain and retain control of the computing device display. After determining that a software program is taking suspicious measures to control the device display, systems and methods described herein may perform an in-depth analysis of the software program, possibly including obtaining a reputation for the software program and/or a performing behavioral observation of the software program. By using these systems and methods, new or previously-unidentified display-controlling malware programs may be identified, based on their behavior. Display-controlling malware may be identified with greater accuracy versus code analysis methods or methods relying solely behavioral analysis. False positive identifications may be averted by comparing observed behavior of the software program with the behavior of various categories of harmless software programs.

Figure 4:
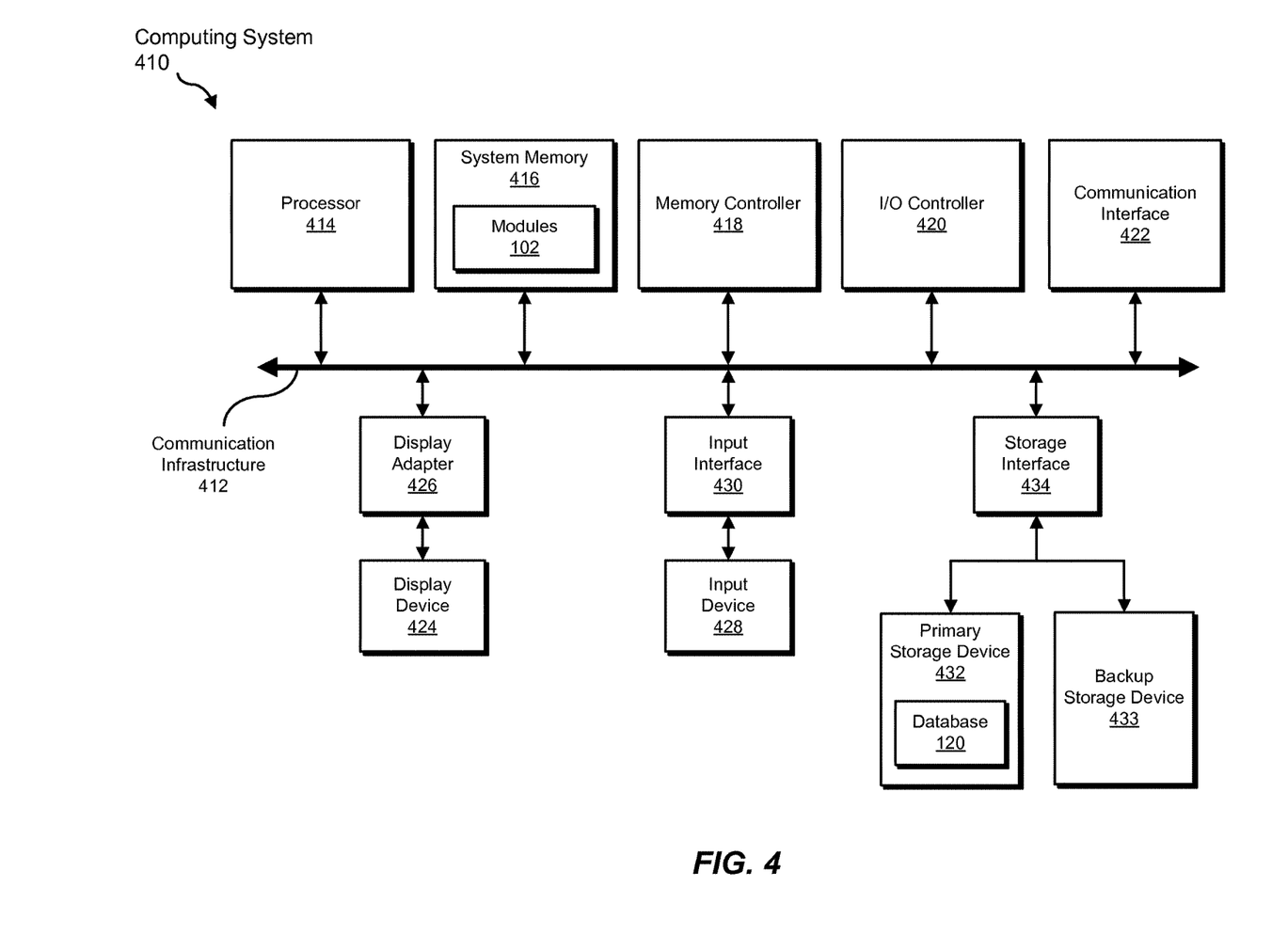
FIG. 4 is a block diagram of an exemplary computing system capable of implementing one or more of the embodiments described and/or illustrated herein.

FIG. 4 is a block diagram of an exemplary computing system 410 capable of implementing one or more of the embodiments described and/or illustrated herein. For example, all or a portion of computing system 410 may perform and/or be a means for performing, either alone or in combination with other elements, one or more of the steps described herein (such as one or more of the steps illustrated in FIG. 3). All or a portion of computing system 410 may also perform and/or be a means for performing any other steps, methods, or processes described and/or illustrated herein.

Computing system 410 broadly represents any single or multi-processor computing device or system capable of executing computer-readable instructions. Examples of computing system 410 include, without limitation, workstations, laptops, client-side terminals, servers, distributed computing systems, handheld devices, or any other computing system or device. In its most basic configuration, computing system 410 may include at least one processor 414 and a system memory 416.

Processor 414 generally represents any type or form of physical processing unit (e.g., a hardware-implemented central processing unit) capable of processing data or interpreting and executing instructions. In certain embodiments, processor 414 may receive instructions from a software application or module. These instructions may cause processor 414 to perform the functions of one or more of the exemplary embodiments described and/or illustrated herein.

System memory 416 generally represents any type or form of volatile or non-volatile storage device or medium capable of storing data and/or other computer-readable instructions. Examples of system memory 416 include, without limitation, Random Access Memory (RAM), Read Only Memory (ROM), flash memory, or any other suitable memory device. Although not required, in certain embodiments computing system 410 may include both a volatile memory unit (such as, for example, system memory 416) and a non-volatile storage device (such as, for example, primary storage device 432, as described in detail below). In one example, one or more of modules 102 from FIG. 1 may be loaded into system memory 416.

In certain embodiments, exemplary computing system 410 may also include one or more components or elements in addition to processor 414 and system memory 416. For example, as illustrated in FIG. 4, computing system 410 may include a memory controller 418, an Input/Output (I/O) controller 420, and a communication interface 422, each of which may be interconnected via a communication infrastructure 412. Communication infrastructure 412 generally represents any type or form of infrastructure capable of facilitating communication between one or more components of a computing device. Examples of communication infrastructure 412 include, without limitation, a communication bus (such as an Industry Standard Architecture (ISA), Peripheral Component Interconnect (PCI), PCI Express (PCIe), or similar bus) and a network.

Memory controller 418 generally represents any type or form of device capable of handling memory or data or controlling communication between one or more components of computing system 410. For example, in certain embodiments memory controller 418 may control communication between processor 414, system memory 416, and I/O controller 420 via communication infrastructure 412.

I/O controller 420 generally represents any type or form of module capable of coordinating and/or controlling the input and output functions of a computing device. For example, in certain embodiments I/O controller 420 may control or facilitate transfer of data between one or more elements of computing system 410, such as processor 414, system memory 416, communication interface 422, display adapter 426, input interface 430, and storage interface 434.

Communication interface 422 broadly represents any type or form of communication device or adapter capable of facilitating communication between exemplary computing system 410 and one or more additional devices. For example, in certain embodiments communication interface 422 may facilitate communication between computing system 410 and a private or public network including additional computing systems. Examples of communication interface 422 include, without limitation, a wired network interface (such as a network interface card), a wireless network interface (such as a wireless network interface card), a modem, and any other suitable interface. In at least one embodiment, communication interface 422 may provide a direct connection to a remote server via a direct link to a network, such as the Internet. Communication interface 422 may also indirectly provide such a connection through, for example, a local area network (such as an Ethernet network), a personal area network, a telephone or cable network, a cellular telephone connection, a satellite data connection, or any other suitable connection.

In certain embodiments, communication interface 422 may also represent a host adapter configured to facilitate communication between computing system 410 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 422 may also allow computing system 410 to engage in distributed or remote computing. For example, communication interface 422 may receive instructions from a remote device or send instructions to a remote device for execution.

As illustrated in FIG. 4, computing system 410 may also include at least one display device 424 coupled to communication infrastructure 412 via a display adapter 426. Display device 424 generally represents any type or form of device capable of visually displaying information forwarded by display adapter 426. Similarly, display adapter 426 generally represents any type or form of device configured to forward graphics, text, and other data from communication infrastructure 412 (or from a frame buffer, as known in the art) for display on display device 424.

As illustrated in FIG. 4, exemplary computing system 410 may also include at least one input device 428 coupled to communication infrastructure 412 via an input interface 430. Input device 428 generally represents any type or form of input device capable of providing input, either computer or human generated, to exemplary computing system 410. Examples of input device 428 include, without limitation, a keyboard, a pointing device, a speech recognition device, or any other input device.

As illustrated in FIG. 4, exemplary computing system 410 may also include a primary storage device 432 and a backup storage device 433 coupled to communication infrastructure 412 via a storage interface 434. Storage devices 432 and 433 generally represent any type or form of storage device or medium capable of storing data and/or other computer-readable instructions. For example, storage devices 432 and 433 may be a magnetic disk drive (e.g., a so-called hard drive), a solid state drive, a floppy disk drive, a magnetic tape drive, an optical disk drive, a flash drive, or the like. Storage interface 434 generally represents any type or form of interface or device for transferring data between storage devices 432 and 433 and other components of computing system 410. In one example, database 120 from FIG. 1 may be stored in primary storage device 432.

In certain embodiments, storage devices 432 and 433 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 432 and 433 may also include other similar structures or devices for allowing computer software, data, or other computer-readable instructions to be loaded into computing system 410. For example, storage devices 432 and 433 may be configured to read and write software, data, or other computer-readable information. Storage devices 432 and 433 may also be a part of computing system 410 or may be a separate device accessed through other interface systems.

Many other devices or subsystems may be connected to computing system 410. Conversely, all of the components and devices illustrated in FIG. 4 need not be present to practice the embodiments described and/or illustrated herein. The devices and subsystems referenced above may also be interconnected in different ways from that shown in FIG. 4. Computing system 410 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 410. All or a portion of the computer program stored on the computer-readable medium may then be stored in system memory 416 and/or various portions of storage devices 432 and 433. When executed by processor 414, a computer program loaded into computing system 410 may cause processor 414 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 410 may be configured as an Application Specific Integrated Circuit (ASIC) adapted to implement one or more of the exemplary embodiments disclosed herein.

Figure 5:
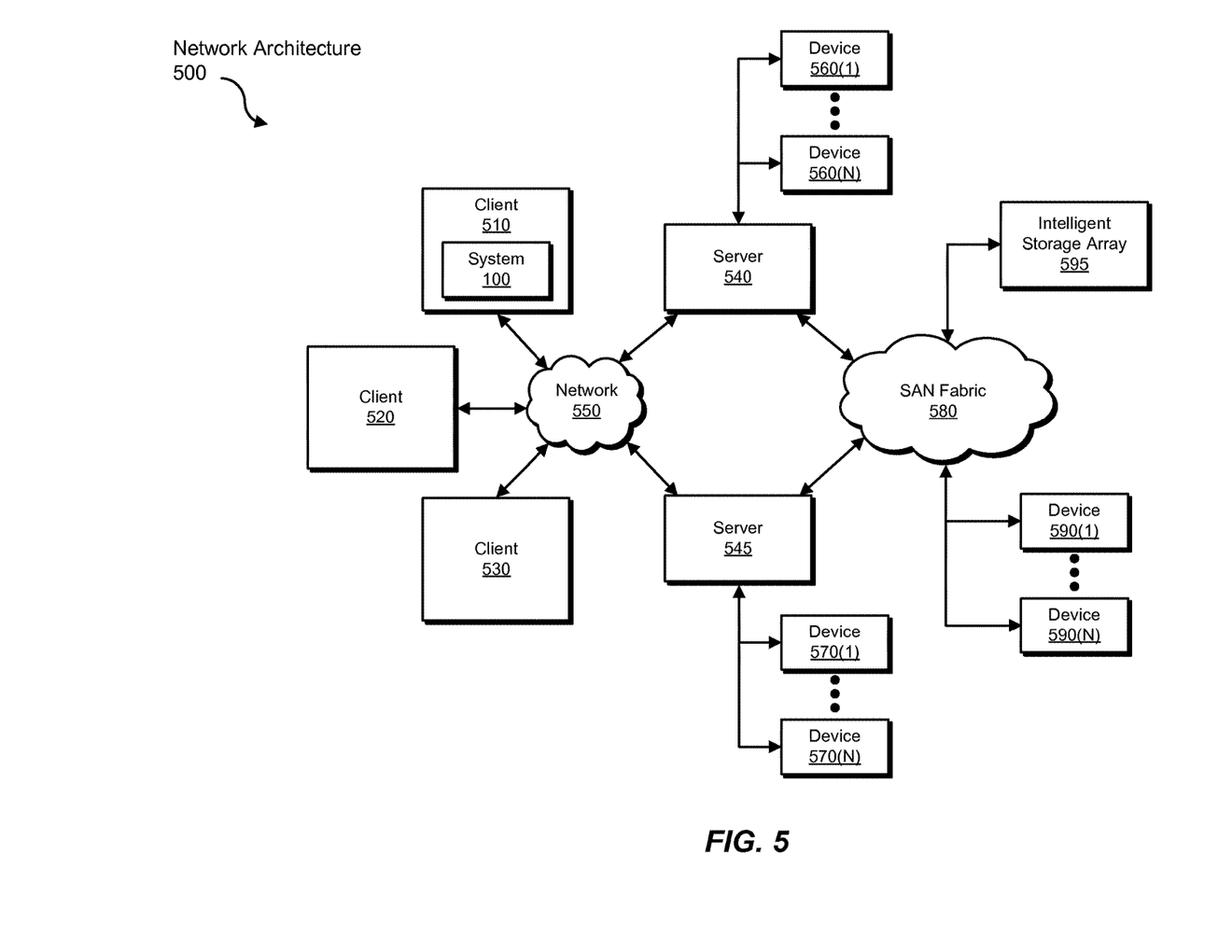
FIG. 5 is a block diagram of an exemplary computing network capable of implementing one or more of the embodiments described and/or illustrated herein.

FIG. 5 is a block diagram of an exemplary network architecture 500 in which client systems 510, 520, and 530 and servers 540 and 545 may be coupled to a network 550. As detailed above, all or a portion of network architecture 500 may perform and/or be a means for performing, either alone or in combination with other elements, one or more of the steps disclosed herein (such as one or more of the steps illustrated in FIG. 3). All or a portion of network architecture 500 may also be used to perform and/or be a means for performing other steps and features set forth in the instant disclosure.

Client systems 510, 520, and 530 generally represent any type or form of computing device or system, such as exemplary computing system 410 in FIG. 4. Similarly, servers 540 and 545 generally represent computing devices or systems, such as application servers or database servers, configured to provide various database services and/or run certain software applications. Network 550 generally represents any telecommunication or computer network including, for example, an intranet, a WAN, a LAN, a PAN, or the Internet. In one example, client systems 510, 520, and/or 530 and/or servers 540 and/or 545 may include all or a portion of system 100 from FIG. 1.

As illustrated in FIG. 5, one or more storage devices 560(1)-(N) may be directly attached to server 540. Similarly, one or more storage devices 570(1)-(N) may be directly attached to server 545. Storage devices 560(1)-(N) and storage devices 570(1)-(N) generally represent any type or form of storage device or medium capable of storing data and/or other computer-readable instructions. In certain embodiments, storage devices 560(1)-(N) and storage devices 570(1)-(N) may represent Network-Attached Storage (NAS) devices configured to communicate with servers 540 and 545 using various protocols, such as Network File System (NFS), Server Message Block (SMB), or Common Internet File System (CIFS).

Servers 540 and 545 may also be connected to a Storage Area Network (SAN) fabric 580. SAN fabric 580 generally represents any type or form of computer network or architecture capable of facilitating communication between a plurality of storage devices. SAN fabric 580 may facilitate communication between servers 540 and 545 and a plurality of storage devices 590(1)-(N) and/or an intelligent storage array 595. SAN fabric 580 may also facilitate, via network 550 and servers 540 and 545, communication between client systems 510, 520, and 530 and storage devices 590(1)-(N) and/or intelligent storage array 595 in such a manner that devices 590(1)-(N) and array 595 appear as locally attached devices to client systems 510, 520, and 530. As with storage devices 560(1)-(N) and storage devices 570(1)-(N), storage devices 590(1)-(N) and intelligent storage array 595 generally represent any type or form of storage device or medium capable of storing data and/or other computer-readable instructions.

In certain embodiments, and with reference to exemplary computing system 410 of FIG. 4, a communication interface, such as communication interface 422 in FIG. 4, may be used to provide connectivity between each client system 510, 520, and 530 and network 550. Client systems 510, 520, and 530 may be able to access information on server 540 or 545 using, for example, a web browser or other client software. Such software may allow client systems 510, 520, and 530 to access data hosted by server 540, server 545, storage devices 560(1)-(N), storage devices 570(1)-(N), storage devices 590(1)-(N), or intelligent storage array 595. Although FIG. 5 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 540, server 545, storage devices 560(1)-(N), storage devices 570(1)-(N), storage devices 590(1)-(N), intelligent storage array 595, or any combination thereof. All or a portion of one or more of the exemplary embodiments disclosed herein may also be encoded as a computer program, stored in server 540, run by server 545, and distributed to client systems 510, 520, and 530 over network 550.

As detailed above, computing system 410 and/or one or more components of network architecture 500 may perform and/or be a means for performing, either alone or in combination with other elements, one or more steps of an exemplary method for detecting display-controlling malware.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a computing system into a system for detecting display-controlling malware. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for detecting display-controlling malware, at least a portion of the method being performed by a computing device comprising at least one processor, the method comprising:
   identifying a software program, which is controlling a display of a computing device by interacting with an operating system of the computing device, to determine a display mode in use by the software program by determining that the software program is displaying an application window in an active physical display device that is not a default physical display device for the computing device;
   detecting at least one control measure taken by the software program to prevent loss of control of the computing device display;
   determining, based on a nature of the control measure taken to prevent loss of control of the computing device display, whether at least one of:
      the nature of the control measure is sufficient to determine that the software program comprises display-controlling malware; or
      the nature of the control measure merits additional analysis of the software program;
   determining, based at least on the nature of the control measure taken to prevent loss of control of the computing device display, that the software program includes display-controlling malware; and
   performing a security action in response to determining that the software program includes the display-controlling malware.

2. The computer-implemented method of claim 1, wherein the control measure taken by the software program to prevent loss of control of the computing device display comprises at least one of:
   displaying a full-display application view;
   displaying an application view in an active display that is not a default display for the computing device;
   configuring the software program to launch during an operating system start-up procedure;
   blocking one or more actions of a user of the computing device to take control of the computing device display away from the software program;
   blocking at least one action of a second software program to take control of the computing device display away from the software program;

disabling the second software program;
blocking display of the application view of the second software program;
displaying the application view without identification of the software program; and
displaying the application view while omitting a control for modifying the application view, wherein the control for modifying the application view includes at least one of:
 a control for resizing the application view; a control for closing the application view;
 a control for moving the application view; and
 a control for minimizing the application view.

3. The computer-implemented method of claim 2, wherein: the control measure taken by the software program to prevent loss of control of the computing device display comprises configuring the software program to launch during the operating system start-up procedure; and
configuring the software program to launch during the operating system start-up procedure comprises at least one of:
 installing the software program in a storage location used by the operating system to contain software programs to be executed during the operating system start-up procedure; and
 configuring the software program in a configuration data store of the operating system to be executed during the operating system start-up procedure.

4. The computer-implemented method of claim 1, wherein the additional analysis of the software program comprises:
obtaining information that identifies the software program;
querying, using the information that identifies the software program, a program reputation database that associates software program information with software program reputation scores; and
receiving, in response to querying the program reputation database, a reputation score for the software program; and
determining, based on the reputation score for the software program, that the software program is not safe, wherein determining that the software program includes display-controlling malware is further based on the determination that the software program is not safe.

5. The computer-implemented method of claim 4, wherein obtaining information that identifies the software program comprises at least one of:
calculating a signature hash for the software program;
identifying a behavioral property of the software program;
identifying a storage location for an executable file of the software program;
identifying a process of the software program; and
identifying at least one attribute of an application view of the software program.

6. The computer-implemented method of claim 1, wherein the additional analysis of the software program comprises observing behavior of the software program and comparing the behavior of the software program with behavior of harmless software to avoid false positive malware detection wherein observing behavior of the software program comprises at least one of:
determining that an application view of the software program does not continuously change;
determining that selected areas of the application view of the software program do not continuously change;
determining that the software program is not displaying content of an optical disk;
and determining that the software program is not displaying content streamed from a network.

7. The computer-implemented method of claim 1, wherein the security action comprises at least one of:
disabling the software program;
providing a user interface element that enables a user of the computing device to activate a virtual display for the computing device, where the virtual display is not controlled by the software program; and
notifying a user that the software program is suspicious and possibly includes display-controlling malware.

8. A system for detecting display-controlling malware, the system comprising: a memory device storing computer-executable instructions and at least one processor that executes the computer-executable instructions to:
identify a software program, which is controlling a display of a computing device by interacting with an operating system of the computing device, to determine a display mode in use by the software program by determining that the software program is displaying an application window in an active physical display device that is not a default physical display device for the computing device;
detect at least one control measure taken by the software program to prevent loss of control of the computing device display;
determine, based on a nature of the control measure taken to prevent loss of control of the computing device display, whether at least one of:
 the nature of the control measure is sufficient to determine that the software program comprises display-controlling malware; or
 the nature of the control measure merits additional analysis of the software program;
determine, based at least on the nature of the control measure taken to prevent loss of control of the computing device display, that the software program includes display-controlling malware; and
perform a security action in response to determining that the software program includes the display-controlling malware.

9. The system of claim 8, wherein the control measure taken by the software program to prevent loss of control of the computing device display comprises at least one of:
displaying a full-display application view;
displaying an application view in an active display that is not a default display for the computing device;
configuring the software program to launch during an operating system start-up procedure;
blocking one or more actions of a user of the computing device to take control of the computing device display away from the software program;
blocking one or more actions of a second software program to take control of the computing device display away from the software program;
disabling the second software program;
blocking display of the application view of the second software program;
displaying the application view without identification of the software program; and
displaying the application view while omitting a control for modifying the application view, wherein the control for modifying the application view includes at least one of:

a control for resizing the application view; a control for closing the application view;
a control for moving the application view;
and a control for minimizing the application view.

10. The system of claim 9, wherein:
the control measure taken by the software program to prevent loss of control of the computing device display comprises configuring the software program to launch during the operating system start-up procedure; and
configuring the software program to launch during the operating system start-up procedure comprises at least one of:
    installing the software program in a storage location used by the operating system to contain software programs to be executed during the operating system start-up procedure; and
    configuring the software program in a configuration data store of the operating system to be executed during the operating system start-up procedure.

11. The system of claim 8, wherein the at least one processor executes the computer-executable instructions to perform the additional analysis of the software program by:
    obtaining information that identifies the software program;
    querying, using the information that identifies the software program, a program reputation database that associates software program information with software program reputation scores;
    receiving, in response to querying the program reputation database, a reputation score for the software program; and
    determining, based on the reputation score for the software program, that the software program is not safe, wherein determining that the software program includes display-controlling malware is further based on the determination that the software program is not safe.

12. The system of claim 11, wherein the at least one processor executes the computer-executable instructions to obtain the information that identifies the software program by at least one of:
    calculating a signature hash for the software program;
    identifying a behavioral property of the software program;
    identifying a storage location for an executable file of the software program;
    identifying a process of the software program; and
    identifying at least one attribute of an application view of the software program.

13. The system of claim 8, wherein the at least one processor executes the computer-executable instructions to perform the additional analysis of the software program by observing behavior of the software program and comparing the behavior of the software program with behavior of harmless software to avoid false positive malware detection by performing a behavioral observation of the software program comprising at least one of:
    determining that an application view of the software program does not continuously change;
    determining that selected areas of the application view of the software program do not continuously change;
    determining that the software program is not displaying content of an optical disk;
    and determining that the software program is not displaying content streamed from a network.

14. The system of claim 8, wherein the at least one processor executes the computer-executable instructions to perform a security action comprising at least one of:
    disabling the software program;
    providing a user interface element that enables a user of the computing device to activate a virtual display for the computing device, where the virtual display is not controlled by the software program; and
    notifying a user that the software program is suspicious and possibly includes display-controlling malware.

15. The system of claim 8, wherein interacting with the operating system of the computing device comprises using at least one application programming interface of the operating system to determine the display mode in use by the software program.

16. The system of claim 8, wherein the at least one processor executes the computer-executable instructions to detect the control measure taken by the software program by using at least one application programming interface of the operating system of computing device to detect an operating state of the computing device.

17. A non-transitory computer-readable-storage medium comprising one or more computer-executable instructions that is executed by at least one processor of a computing device, causing the computing device to:
    identify a software program, which is controlling a display of a computing device by interacting with an operating system of the computing device, to determine a display mode in use by the software program by determining that the software program is displaying an application window in an active physical display device that is not a default physical display device for the computing device;
    detect at least one control measure taken by the software program to prevent loss of control of the computing device display;
    determine, based on a nature of the control measure taken to prevent loss of control of the computing device display, whether at least one of:
        the nature of the control measure is sufficient to determine that the software program comprises display-controlling malware; or
        the nature of the control measure merits additional analysis of the software program;
    determine, based at least on the nature of the control measure taken to prevent loss of control of the computing device display, that the software program includes display-controlling malware; and
    perform a security action in response to determining that the software program includes the display-controlling malware.

* * * * *